United States Patent
Bryson et al.

(10) Patent No.: US 9,734,684 B2
(45) Date of Patent: Aug. 15, 2017

(54) PERIMETER MONITORING USING AUTONOMOUS DRONES

(71) Applicant: International Business Machines Corporation, Armonk, NY (US)

(72) Inventors: Donald L. Bryson, Chattanooga, TN (US); Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/987,000

(22) Filed: Jan. 4, 2016

(65) Prior Publication Data
US 2017/0193781 A1    Jul. 6, 2017

(51) Int. Cl.
*G08B 21/00* (2006.01)
*G08B 13/24* (2006.01)
*H04W 4/02* (2009.01)
*G08G 5/00* (2006.01)
*H04W 84/18* (2009.01)

(52) U.S. Cl.
CPC ....... *G08B 13/2491* (2013.01); *G08G 5/0073* (2013.01); *H04W 4/021* (2013.01); *H04W 84/18* (2013.01)

(58) Field of Classification Search
CPC . G08B 13/2491; G08G 5/0073; H04W 4/021; H04W 84/18
USPC .... 340/946, 947, 948, 950, 970, 980; 701/2, 701/3, 120, 467
See application file for complete search history.

(56) References Cited

U.S. PATENT DOCUMENTS

| | | | |
|---|---|---|---|
| 6,723,975 B2 | 4/2004 | Saccomanno | |
| 2015/0379874 A1* | 12/2015 | Ubhi | G01S 5/0027 701/3 |
| 2016/0116914 A1* | 4/2016 | Mucci | G05D 1/101 701/2 |
| 2016/0134358 A1* | 5/2016 | Jalali | H04B 7/18504 455/11.1 |
| 2016/0189549 A1* | 6/2016 | Marcus | G08G 5/0034 701/3 |
| 2016/0321930 A9* | 11/2016 | Yu | G08G 5/006 |
| 2016/0321931 A9* | 11/2016 | Wang | G08G 5/006 |

FOREIGN PATENT DOCUMENTS

FR    3003356    9/2014

* cited by examiner

*Primary Examiner* — Dhaval Patel
(74) *Attorney, Agent, or Firm* — Cantor Colburn LLP; Damion Josephs (57) ABSTRACT

Aspects include a method, system and computer program product for monitoring a fence about an ad-hoc perimeter. The method includes defining an ad-hoc perimeter to be monitored. A number of autonomous drones are determined for creating a monitoring fence arrangement of the ad-hoc perimeter, each of the autonomous drones including a movement detection mechanism. A position is determined for each of the determined number of autonomous drones. The position is transmitted to each of the autonomous drones. A status of the autonomous drones is monitored. A signal is transmitted in response to at least one of the autonomous drones detecting a breach of the ad-hoc perimeter with the movement detection mechanism.

20 Claims, 8 Drawing Sheets

PERIMETER MONITORING USING AUTONOMOUS DRONES

BACKGROUND

The present invention relates generally to a system and method for monitoring a perimeter and, more specifically, to a system and method for using autonomous drones for monitoring an ad-hoc perimeter.

Autonomous drones, also referred to as unmanned aerial vehicles (UAVs) can be used to achieve a certain set of needs or tasks such monitoring a boundary or providing security for an object.

SUMMARY

Embodiments include a method, system and computer program product for monitoring a fence about an ad-hoc perimeter. The method includes defining an ad-hoc perimeter to be monitored. A number of autonomous drones are determined for creating a monitoring fence arrangement of the ad-hoc perimeter, each of the autonomous drones including a movement detection mechanism. A position is determined for each of the determined number of autonomous drones. The position is transmitted to each of the autonomous drones. A status of the autonomous drones is monitored. A signal is transmitted in response to at least one of the autonomous drones detecting a breach of the ad-hoc perimeter with the movement detection mechanism.

Additional features are realized through the techniques of the present invention. Other embodiments and aspects of the invention are described in detail herein and are considered a part of the claimed invention. For a better understanding of the invention with the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features of embodiments of the invention are apparent from the following detailed description taken in conjunction with the accompanying drawings in which:

DETAILED DESCRIPTION

Embodiments of the present disclosure are directed to a system and method for creating a monitoring fence, such as a laser fence, about an ad-hoc perimeter using autonomous drones. Embodiments provide for transmitting a signal, such as to trigger an alarm, in response to one or of the autonomous drones detecting a breach of the perimeter. Embodiments provide for the dynamic changing of the ad-hoc perimeter while maintaining the monitoring fence. Still further embodiments provide for automatically replacing an autonomous drone with a new autonomous drone in response to a stored energy level of the autonomous drone falling below a predetermined threshold.

Figure 1:
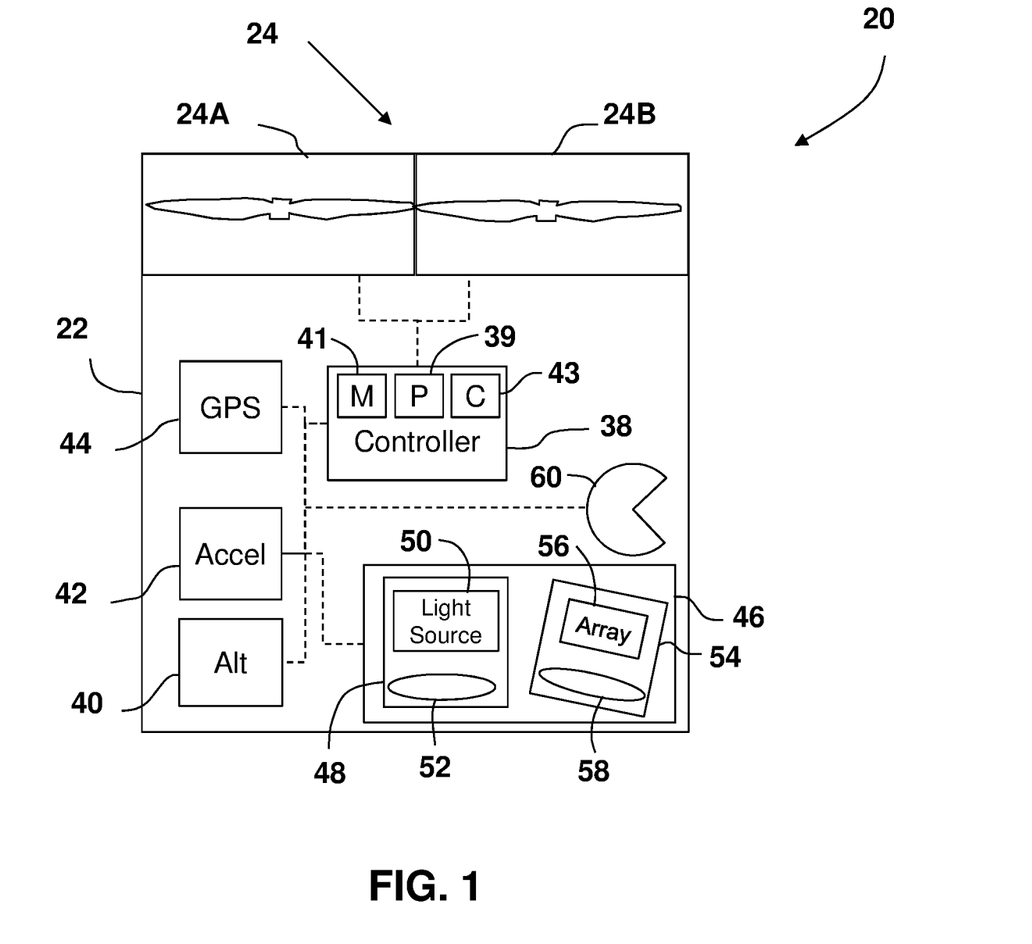
FIG. 1 depicts a block diagram of an autonomous drone in accordance with an embodiment of this disclosure.

Referring now to FIG. 1, an embodiment is shown of an autonomous drone 20 or unmanned aerial vehicle. As used herein, the term "drone" refers to an aerial vehicle capable to operating autonomously from a human operator to perform a predetermined function, such as perform monitoring functions for example. The drone 20 includes a fuselage 22 that supports at least one thrust device 24. In an embodiment, the drone 20 includes a plurality of thrust devices 24A, 24B, such as four thrust devices arranged about the periphery of the fuselage 22. In an embodiment, the thrust devices 24 include propeller member that rotates to produce thrust. The thrust devices 24 may be configurable to provide both lift (vertical thrust) and lateral thrust (horizontal thrust). The vertical and horizontal components of the thrust allow the changing of the altitude, lateral movement and orientation (attitude) of the drone 20.

The drone 20 includes a controller 38 having a processing circuit. The controller 38 may include processors that are responsive to operation control methods embodied in application code. These methods are embodied in computer instructions written to be executed by the processor, such as in the form of software. The controller 38 may further include additional circuits, such as but not limited to one or more processors 39, memory circuits 41 and communications circuits 43 for example. The communications circuit may be via a wireless communications medium. The wireless communications medium may include WiFi (e.g. IEEE 802.11), a Bluetooth® (e.g. IEEE 802.15.1 and its successors), RFID, near field communications (NFC), or cellular (e.g. LTE, GSM, EDGE, UMTS, HSPA and 3GPP cellular network technologies) for example.

The controller 38 is coupled transmit and receive signals from the thrust devices 24 to determine and change their operational states (e.g. adjust lift from thrust devices 24, change the position of the drone 20). The controller 38 may further be coupled to one or more sensor devices that enable to the controller to determine the position, orientation and altitude of the drone 20. In an embodiment, these sensors may include an altimeter 40, a gyroscope or accelerometers 42 or a global positioning satellite (GPS) system 44. The controller 38 may use these input to operate the thrust devices 24 to move the drone 20 to a predetermined position and orientation, and to maintain the drone 20 in that position and orientation.

The drone 20 further includes a movement detection mechanism 46 coupled to communicate with the controller 38. In the exemplary embodiment, the movement detection mechanism includes a projector 48 having a light source 50 and a lens arrangement 52. The light source 50 may include an incoherent (LED) or coherent (laser) light in a visible or non-visible (e.g. infrared) wavelength spectrum. Arranged in a fixed geometric relationship with the projector 48 is at least one camera 54 arranged to receive light emitted from the projector 48 and reflected off an external surface. Each camera 54 includes an optical sensor such as a photosensitive array 56 and a lens 58. The controller 38 may be able to detect movement when an object crosses the path of the emitted light when the image recorded by the camera 54 is interrupted or distorted based on the movement for example.

In one embodiment, the projector 48 emits a coded pattern, sometime colloquially referred to as structured light. In this embodiment, 3D coordinates of surfaces within the field of view may be determined based on based on a single image sent from a projector 48 onto the surface and captured by the camera 54. From the use of a single projected and captured image it is possible to determine the distance to the object if a way is provided for determining a correspondence between the projected and imaged points. This may be done, for example, by providing projected pattern elements distinctly recognizable by the camera 54. With the correspondence established the controller 38 uses principles of triangulation to determine the 3D coordinates of surface points of the surfaces within the field of view. In still further embodiments, the projector 48 may scan a spot, project a line, or project a pattern over an area. In one embodiment, the projector 48 includes a MEMS based mirror arrangement for moving the projected light. The controller 38 may be able to detect movement when an object crosses the path of the emitted light pattern when the determined 3D coordinates measured by the movement detection mechanism change for example.

In still another embodiment, the projector 48 is omitted and the camera 54 acquires images of the area along a perimeter within a field of view of the camera 54. The controller 38 may use image analysis to determine movement by comparing a currently acquired image with a previously acquired image. Where there is change in the pixels of the current image relative to the previous image, movement may be detected. Still other embodiments may use photogrammetry techniques to monitor active (e.g. LED) or passive (e.g. reflective) targets on an adjacent drone and movement may be detected when the light emitted by or reflected by the targets is interrupted.

In still another embodiment, the drone 20 includes an optical receiver 60. The optical receiver 60 may include a photosensitive sensor that is coupled to communicate with controller 38. As will be discussed in more detail herein, the photosensitive sensor may be configured to detect the light emitted from an adjacent drone. Movement may then be detected with the emitted light is interrupted by someone or something breaching a perimeter. In another embodiment, the optical receiver 60 may be a retroreflector type device that reflects received light back along the path that the light was received. In this embodiment, movement may be detected by the drone emitting the light onto the optical receiver 60 when the return light is interrupted.

In still further embodiments, the movement detection mechanism 46 may include a RADAR type device, a LIDAR type device, an acoustical device (e.g. a microphone) or a SONAR type device.

As will be discussed in more detail herein, a plurality of drones 20 may be arranged about an ad-hoc perimeter to generate a monitoring fence. As used herein, the term monitoring fence means the creation of a continuously and contiguously monitored enclosed boundary where movement or breach of the perimeter may be detected.

Figure 2:
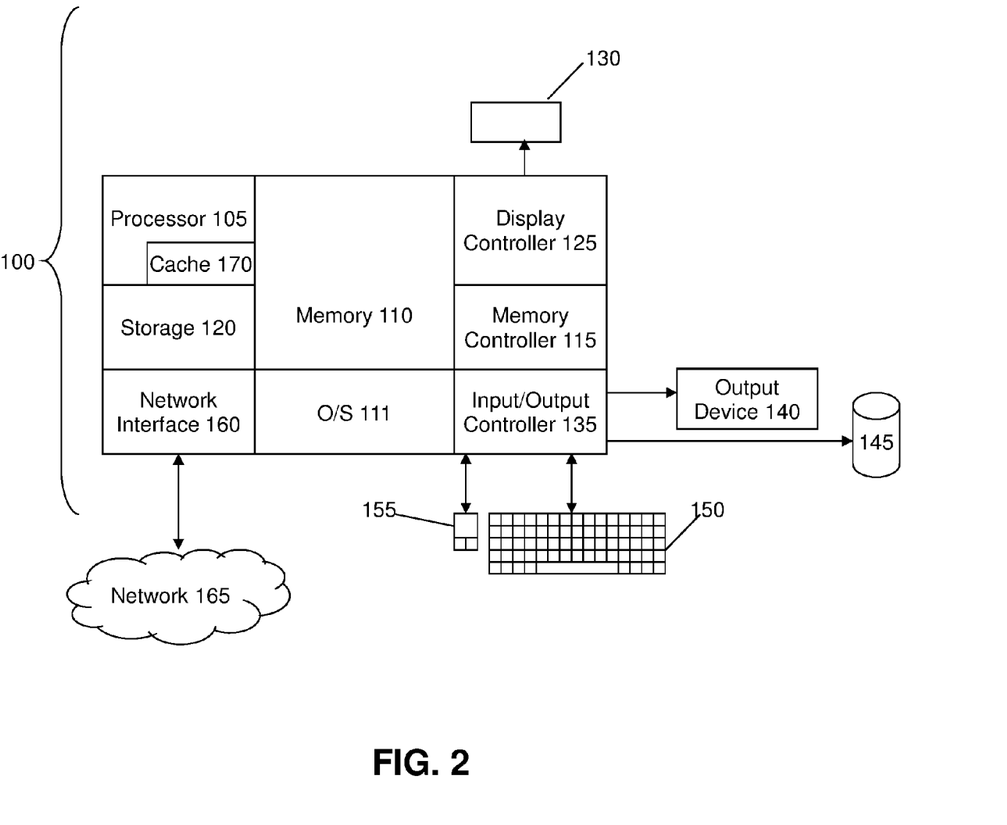
FIG. 2 depicts a block diagram of a controller for an autonomous drone in accordance with an embodiment of this disclosure.

FIG. 2 illustrates a block diagram of a controller 100 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose controller 38, such as a personal computer, workstation, minicomputer, or mainframe computer.

In some embodiments, as shown in FIG. 2, the controller 100 includes a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors, cameras, microphones and the like. Input devices such as a conventional keyboard 150 and mouse 155 may be coupled to the I/O controller. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the controller 38, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The controller 100 may further include a display controller 125 coupled to a user interface or display 130. In some embodiments, the display 130 may be an LCD screen. In some embodiments, the controller 100 may further include a network interface 160 for coupling to a network 165. The network 165 may be an IP-based network for communication between the controller 38 and an external server, client and the like via a broadband connection. The network 165 transmits and receives data between the controller 38 and external systems. In an embodiment, the external system may be the aerial drone 20, wherein the transmitting and receiving of data allows the controller 100 to determine when a monitoring fence or an ad-hoc perimeter has been breached. In some embodiments, the network 165 may be a managed IP network administered by a service provider. The network 165 may be implemented in a wireless fashion, e.g., using wireless protocols and technologies, such as WiFi, WiMax, satellite, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in controller 100, such as that illustrated in FIG. 2.

The monitoring of a perimeter or boundary is a function that has many applications, such as but not limited to security of real estate or portions of real estate, and wireless dog or pet fences for example. These perimeter monitoring systems typically determine when the perimeter has been breached, such as when a dog collar fitted with a transceiver crosses the perimeter for example, and performs an action (e.g. activate the dog collar). These traditional monitoring systems are fixed, meaning they cover a defined boundary and are not generally movable without considerable effort and expense. Also, in the case of a wireless fence for a pet, there are no visual indications on where the perimeter is located, making it difficult for the animal to know how far they can move before being shocked by the collar.

Figure 3:
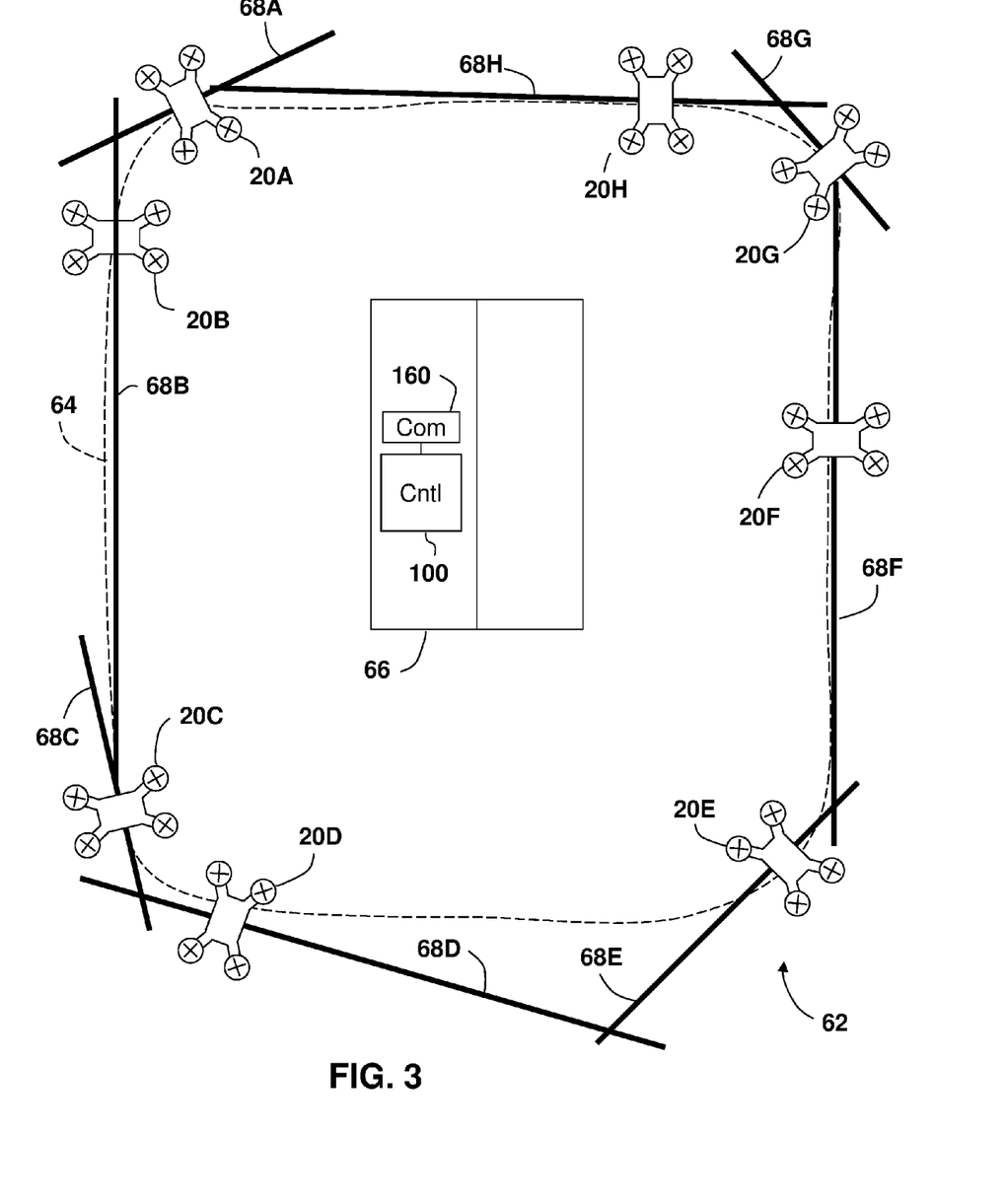
FIG. 3 depicts a plan view of a perimeter monitoring system in accordance with some embodiments of this disclosure.
Figure 4:
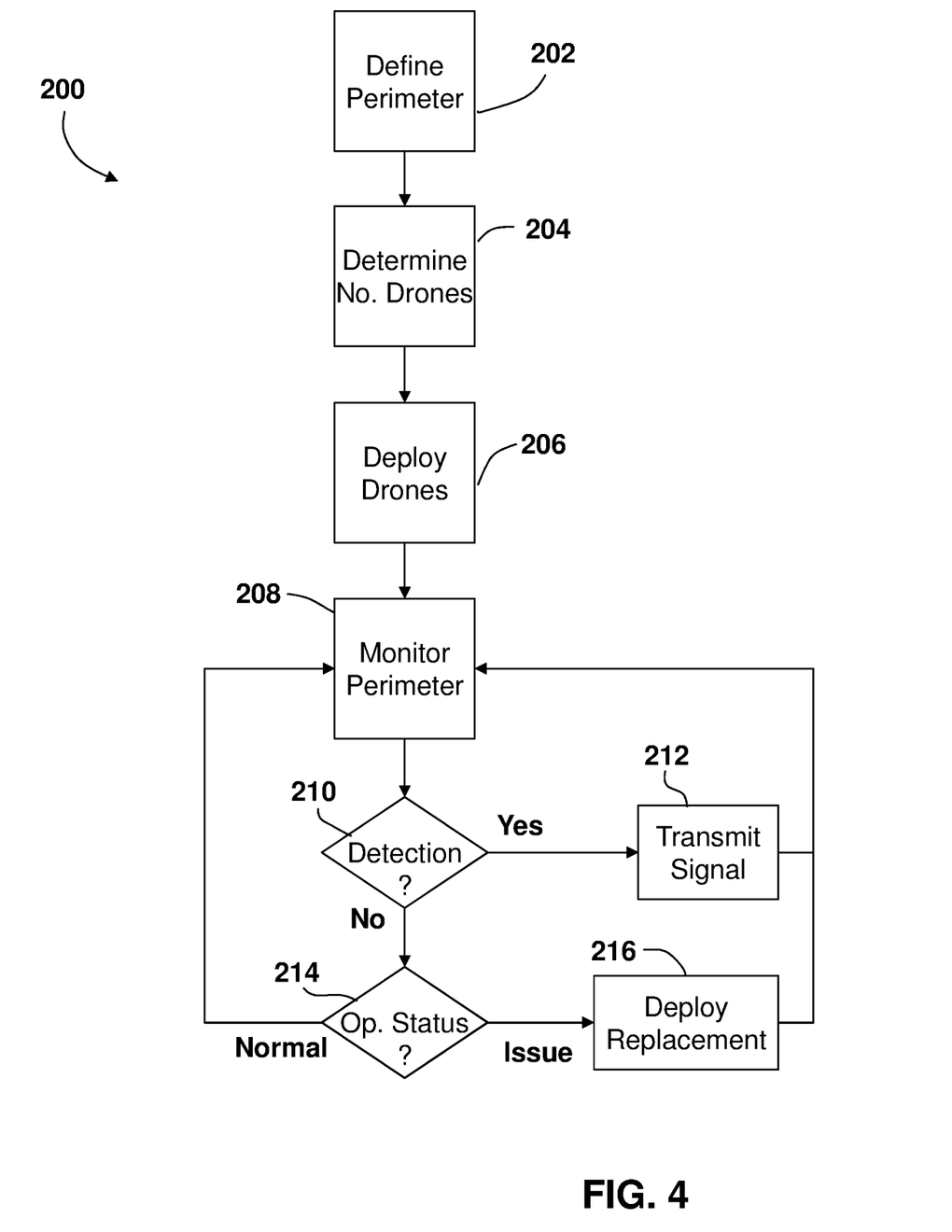
FIG. 4 depicts a flow diagram of a method of monitoring an ad-hoc perimeter in accordance with some embodiments of this disclosure

Referring now to FIG. 3 and FIG. 4, an embodiment is shown for creating a noncontact monitoring fence 62, such as a laser fence for example, arranged to monitor an ad-hoc perimeter 64. As used herein, an "ad-hoc perimeter" is a boundary having an arbitrary shape defined by a system. The boundary may be of any size or shape, may be dynamically changed, and may be stationary or a moving boundary. It should be appreciated that while embodiments herein describe the ad-hoc perimeter 64 as being disposed about a building, this is for exemplary purposes and the claims should not be so limited. In other embodiments, the ad-hoc perimeter 64 may be established about any object or objects for which the detection of an object, person or animal is desired, such as but not limited to an automobile or a tent for example. Further, while embodiments herein describe the perimeter as being an enclosed shape, this is for exemplary purposes and the claims should not be so limited. In other embodiments, the ad-hoc perimeter may be established along an open shape, such as an open area between two physical fences for example.

A method 200 (FIG. 4) is provided for establishing the ad-hoc perimeter 64. The method 200 starts in block 202 where the ad-hoc perimeter 64 is defined, such as about the building 66 for example. The ad-hoc perimeter 64 may be defined by a system operator or based on parameters defined by the operator (e.g. radius 18 meters, 5 meters from the outside of building 66, etc.). The method 200 then proceeds to block 204 where the number of drones 20A-20H is determined. The number of drones used creating the monitoring fence 62 may be based on the type of monitoring fence 62 that is implemented. For example, the monitoring fence 62 of FIG. 3 may be a laser fence created by a emitting a laser light from each drone 20A-20H, such as with projector 48 (FIG. 1) for example. As discussed in more detail herein, the laser light 68A-68H is projected on along a tangent to the perimeter 64 where the drone is positioned. A reflection of the laser light is captured by the camera 54. When an object, person or animal interrupts the light beam, the controller 38 may determine that the perimeter has been breached. By arranging the drones 20 such that the laser light 68A-68H from adjacent drones intersect, overlap or cross, an ad-hoc monitoring fence of the perimeter may be created In one embodiment, to determine the number of drones for creating the monitoring fence 62, the method 200 first determines the number of tangents to the boundary that are needed to determine the length of the laser fence. In one embodiment, the number of drones may be based on the power rating of the available drones. It should be appreciated that the power or strength of the laser light 68A-68H determines the distance for which a particular drone can detect movement or breach of the perimeter. Since not all drones 20A-20H may have the same power or strength laser light, the method 200 may adjust the number of drones used in the monitoring fence 62. For example, some drones 20A, 20C, 20G may have relatively lower power laser light (as indicated by the shorter laser lines 68A, 68C, 68G) compared to other drones 20B, 20D, 20F, 20H (as indicated by the longer laser lines 68B, 68D, 68F, 68H), while a third level of laser light 68E from drone 20E may have a strength or power that is in between. Thus, the number of drones 20A-20H may be changed based on the availability of the drones or the number of drones the operator desires to use. It should be appreciated that the more drones used, the closer the monitoring fence 62 will coincide with the ad-hoc perimeter 64.

In one embodiment, when the length of the laser fence is determined, a laser total power parameter is determined for this length. The number of drones is then based on the sum of the laser power of the drones being equal to or greater than the laser total power parameter.

With the number of drones determined, the method proceeds to block 206 where the drones are deployed. This may include determining a position for each of the drones 20A-20H and transmitting the positional data to each drone 20A-20H, such as via the communications circuits 43, 160 for example. In an embodiment, the positional data is GPS coordinate data. In another embodiment, the positional data may be relative to another location, such as other drones for example or the building 66 for example. In an embodiment, the perimeter 64 may move and the positional data may include an expected direction and speed. It should be appreciated that the perimeter 64 may be moved on a continuous, periodic or aperiodic basis. As discussed herein, the positional data may be updated and transmitted to the drones 20A-20H on a periodic or aperiodic basis.

Once the drones 20A-20H are deployed to their assigned positions, each drone 20A-20H emits the laser light 68A-68H. In one embodiment, each drone 20A-20H includes a pair of projectors 48 and cameras 54 that are arranged to direct laser light in opposite directions (e.g. front and back). The method 200 then proceeds to block 208 where the perimeter 64 is monitored. The monitoring may include detection of movement (e.g. the laser light is interrupted). In other embodiments, the monitoring may include environmental monitoring (e.g. temperature, wind, and precipitation), thermal monitoring (e.g. infrared), image monitoring, acoustical monitoring (e.g. sound, SONAR) and dimensional monitoring (e.g. structured light).

The method 200 then proceeds to query block 210 where it is determined if the monitoring fence 62 has been breached. In the embodiment where the monitoring fence 62 is a laser fence, the monitoring may include the detection of the interruption of the laser light beam. When the query block 210 returns a positive, the method 200 proceeds to block 212 where the drone transmits a signal, such as through communications circuits 43, 160 for example. The signal is received by the controller 100 and a predetermined action is performed. In the embodiment where the perimeter 64 defines an area for confining a pet, the predetermined action may include activating a collar on the pet. In other embodiments, the predetermined action may be the transmission of a message (e.g. a cellular text, an email or an alert on a software application), the activation of lights, or the activation of an alarm for example.

When the query block 210 returns a negative (no movement detected), the method 200 proceeds to query block 214 where the operational status of the drones 20A-20H is determined. The operational status of a drone may include determining the stored energy levels remaining or the mechanical condition of the drone for example. When the query block 214 returns an indication that a particular drone may have an issue that may impede its ability to maintain a section of the monitoring fence 62, the method 200 proceeds to block 216 where a new drone is deployed to the position of the drone having the issue. The drone having the issue then returns to a home position, such as a recharging station for example. When a new drone is not available to replace the drone having an issue, the method 200 may reposition the remaining drones (e.g. recalculating the tangents) to provide the monitoring fence 62. The drone having the issue then returns to a home position. When the query block 214 returns a normal status, the method 200 loops back to block 208 and monitors the perimeter 64.

Figure 5:
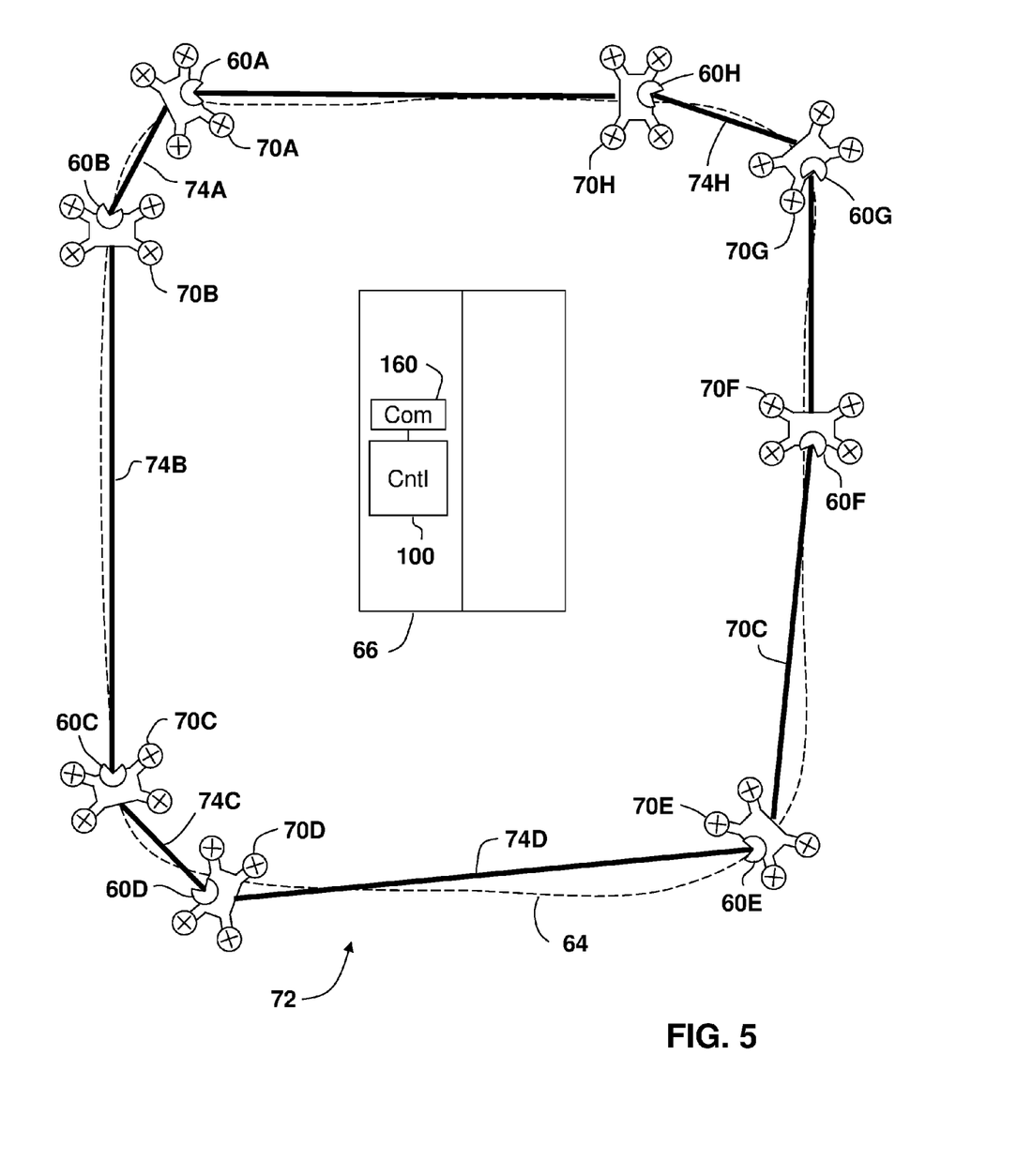
FIG. 5 depicts a plan view of a perimeter monitoring system in accordance with some embodiments of this disclosure.

The embodiment of FIG. 3 illustrated a laser fence having overlapping laser light 68A-68H. Referring now to FIG. 5 another embodiment is illustrated wherein each of the drones 70A-70H are provided with a line-of-sight type laser fence 72. In this embodiment, the drones 70A-70H direct the laser light 74A-74H onto the optical receiver 60A-60H of an adjacent drone. In one embodiment, the optical receiver 60A-60H may be a photosensitive sensor (e.g. a charge coupled device or "CCD" sensor) that detects the light for example. In another embodiment, the optical receiver is a retroreflector device that reflects the laser light 74A-74H back to the emitting drone and captured by the camera 54. In an embodiment, the projectors 48 of the drones may each modulate the emitted laser light (e.g. amplitude or phase modulation) such that each laser light 74A-74H has a different modulation/signature and prevent inadvertent cross-over from an unintended drone or intentional disabling of the laser fence.

Figure 6:
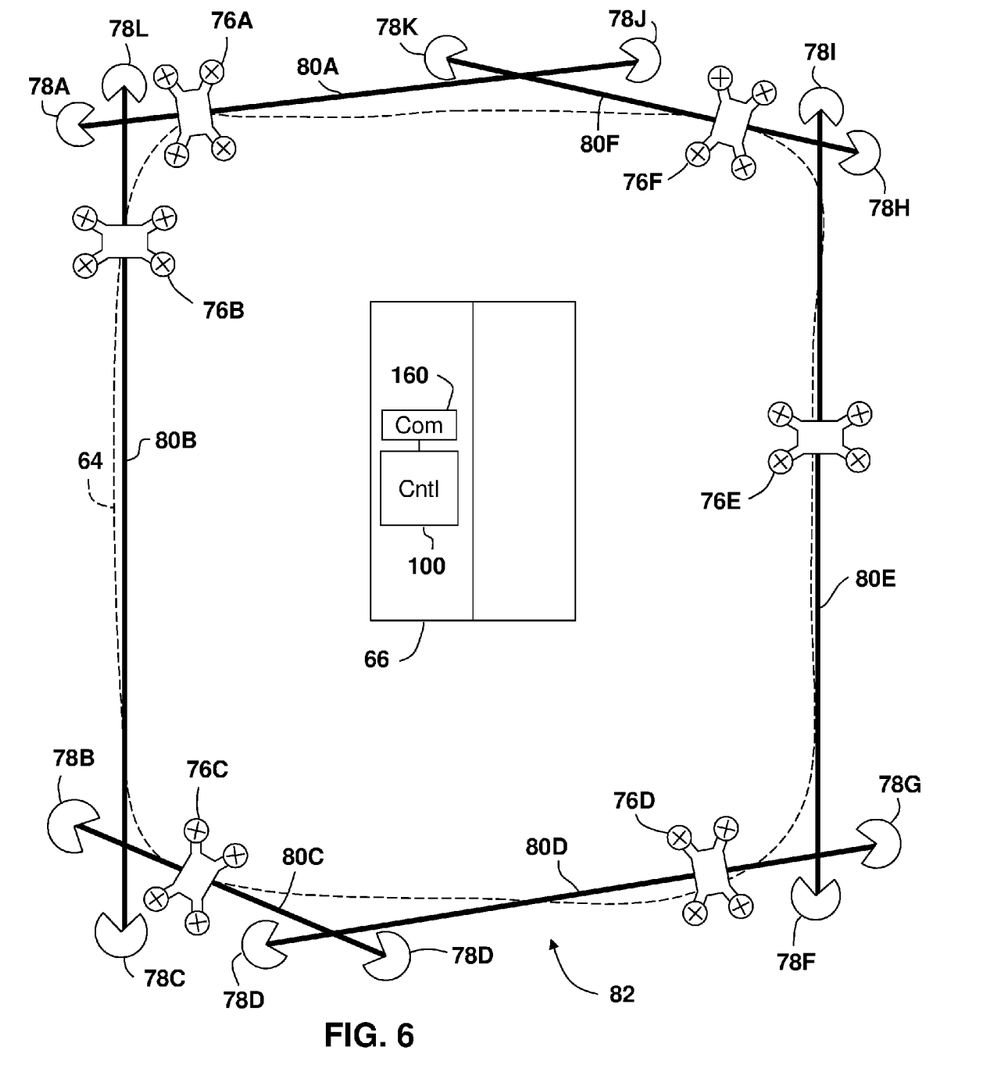
FIG. 6 depicts a plan view of a perimeter monitoring system in accordance with some embodiments of this disclosure.

Referring now to FIG. 6, another embodiment is illustrated wherein each of the drones 76A-76F cooperate with stationary optical receivers 78A-78L. In this embodiment, the drones 76A-76F each emit two laser lights 80A-80F from opposite sides (e.g. front and back) of the drone. The drones 76A-76F are positioned and oriented such that the laser lights 80A-80F intersect with the laser light from adjacent drones. In this manner the monitoring fence 82 encloses the perimeter 64.

The stationary optical receivers 78A-78L are positioned and oriented to receive the laser light 80A-80F. In one embodiment, the stationary optical receivers 78A-78L includes a photosensitive sensor that detects the laser light and transmits a signal, such as a wireless signal for example, when the light is interrupted. In one embodiment, the drones 76A-76F are configured to carry and place the stationary optical receivers 78A-78L when the drones 76A-76F are deployed to create the monitoring fence 82. In an embodiment, the drones 76A-76F are further configured to retrieve the optical receivers and return to a home position when the monitoring fence 82 is no longer needed.

It should be appreciated that while embodiments herein refer to a controller 100 as controlling and managing the monitoring fence and the drones, this is for exemplary purposes and the claims should not be so limited. In other embodiments, the controlling and managing of the monitoring fence and drones may be performed by a plurality of controllers, a distributed computing environment or a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
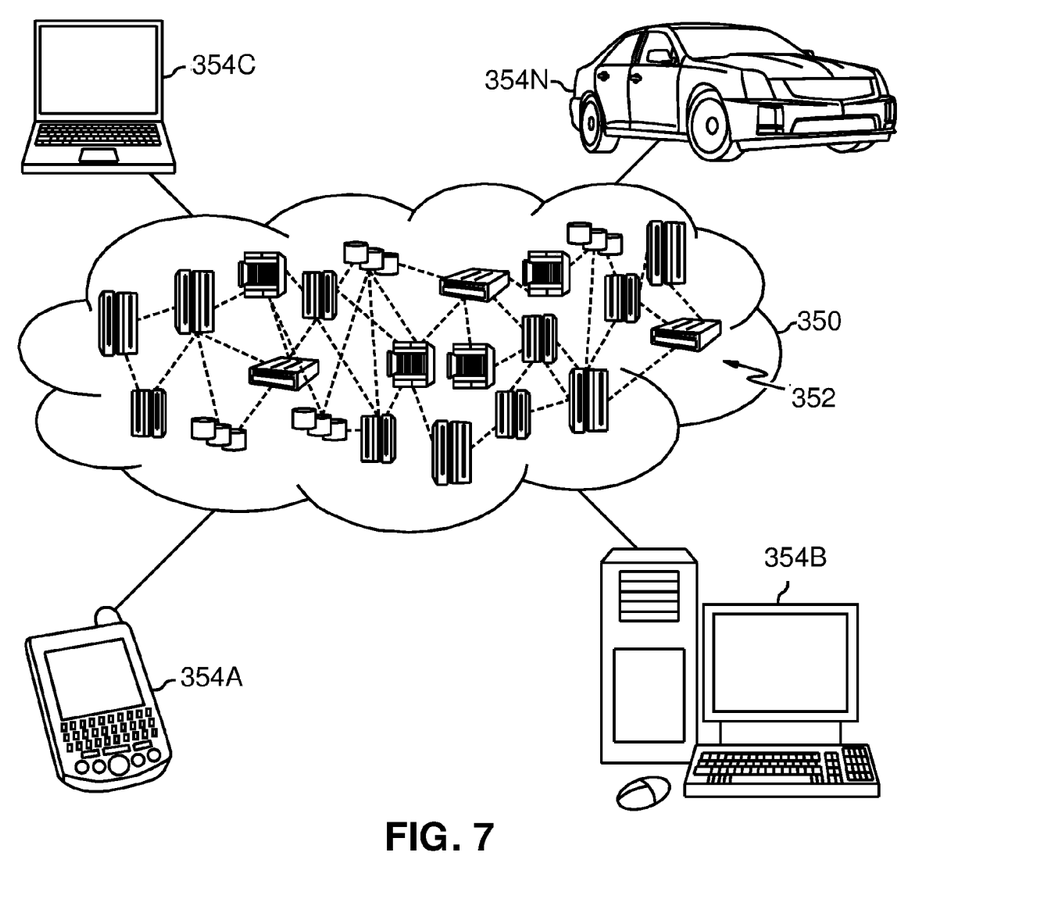
FIG. 7 depicts a cloud computing environment according to an embodiment of the present invention.

Referring now to FIG. 7, illustrative cloud computing environment 350 is depicted. As shown, cloud computing environment 350 comprises one or more cloud computing nodes 352 with which local computing devices used by cloud consumers, such as, for example, personal digital assistant (PDA) or cellular telephone 354A, desktop computer 354B, laptop computer 354C, and/or automobile computer system 354N may communicate. Nodes 352 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 12 are intended to be illustrative only and that computing nodes 352 and cloud computing environment 350 can communicate with any type of computerized device over any type of network and/or network addressable connection (e.g., using a web browser).

Figure 8:
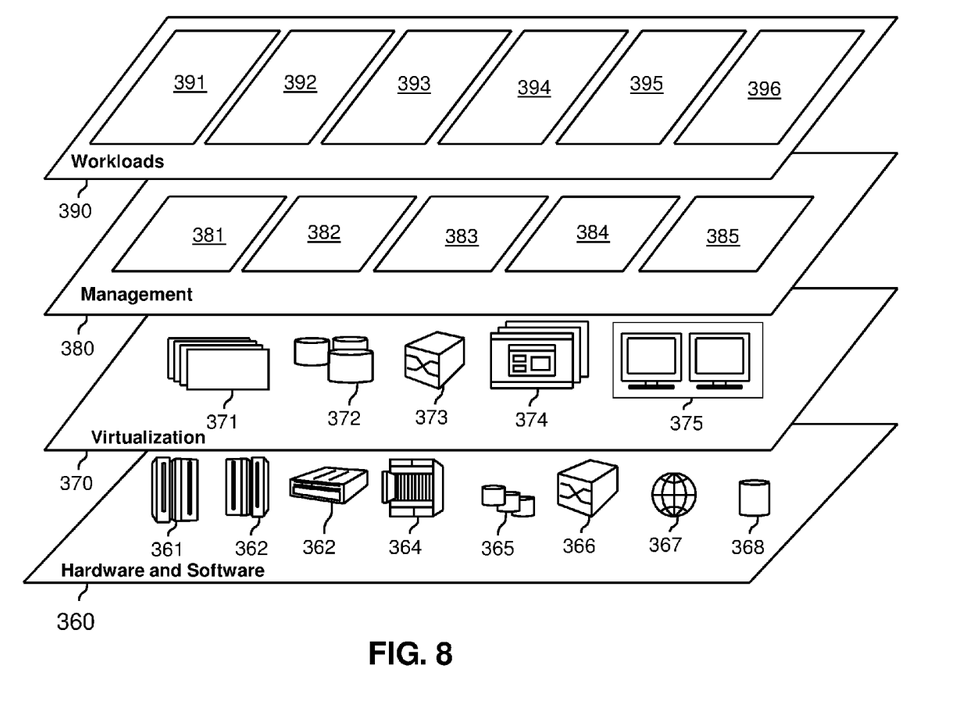
FIG. 8 depicts abstraction model layers according to an embodiment of the present invention.

Referring now to FIG. 8, a set of functional abstraction layers provided by cloud computing environment 350 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provides pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and a drone positioning and monitoring fence management 396. The drone positioning and monitoring fence management 396 may perform one or more methods that allow the creation of a monitoring fence about an ad-hoc perimeter, such as but not limited to the methods described in reference to FIG. 4 for example.

Technical effects and benefits of some embodiments include the creation of a monitoring fence about an ad-hoc perimeter to allow an operator to monitor an arbitrarily defined area. Further technical effects and benefits of some embodiments include the creation of an enclosed ad-hoc area for confining a pet and providing visual clues to the pet as to the location of the perimeter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   defining an ad-hoc perimeter to be monitored, the ad-hoc perimeter having at least one curved portion;
   determining a line tangent to the at least one curved portion;
   determining a number of autonomous drones for creating a monitoring fence arrangement of the ad-hoc perimeter, each of the autonomous drones including a movement detection mechanism, the movement detection mechanism including a light source and a light detector;
   determining a position for each of the determined number of autonomous drones, at least one position being based at least in part on the tangent line;
   transmitting the position to each of the autonomous drones;
   projecting a light from the light source along the tangent line;
   monitoring a status of the autonomous drones;
   transmitting a signal in response to at least one of the autonomous drones detecting a breach of the ad-hoc perimeter based at least in part on detecting movement by receiving with the light detector a reflection of the light by a surface along the tangent line.

2. The method of claim 1 wherein the determining the number of autonomous drones includes determining a number of tangents for the ad-hoc perimeter.

3. The method of claim 2 further comprising determining a total power for operating the autonomous drones used in creating the monitoring fence arrangement.

4. The method of claim 3 wherein a sum of a power rating for each of the autonomous drones is equal to or greater than the total power.

5. The method of claim 1 wherein the light source is a laser emitting light source.

6. The method of claim 5 wherein the the light detector is an optical receiver.

7. The method of claim 1 further comprising determining a stored energy level for each of the autonomous drones, and replacing a first autonomous drone of the autonomous drones with a second autonomous drone in response to the stored energy level of the first autonomous drone being below a predetermined threshold.

8. The method of claim 1 further comprising: moving the ad-hoc perimeter on a periodic or aperiodic basis; determining a new position for each of the autonomous drones based on the moving of the ad-hoc perimeter; determining a second tangent line to an at least one second curved portion of the ad-hoc perimeter; and transmitting the new position to each of the autonomous drones, wherein at least one of new position is at the intersection of the second tangent line and the at least one second curved portion.

9. A system comprising:
   a memory having computer readable instructions; and
   one or more processors for executing the computer readable instructions, the computer readable instructions comprising:
   defining an ad-hoc perimeter to be monitored, the ad-hoc perimeter having at least one curved portion;
   determining a tangent line to the at least one curved portion;
   determining a number of autonomous drones for creating a monitoring fence arrangement of the ad-hoc perimeter, each of the autonomous drones including a movement detection mechanism, the movement detection mechanism including a light source and a light detector;
   determining a position for each of the determined number of autonomous drones, at least one position being based at least in part on the tangent line;
   transmitting the position to each of the autonomous drones, wherein at least one position is located on the tangent line;
   positioning at least one autonomous drone at the at least one position;
   projecting a light from the light source of the at least one autonomous drone along the tangent line;
   monitoring a status of the autonomous drones;
   transmitting a signal in response to at least one of the autonomous drones detecting a breach of the ad-hoc perimeter based at least in part on detecting movement by receiving with the light detector of the at least one autonomous drone a reflection of the light by a surface along the tangent line.

10. The system of claim 9 wherein the determining the number of autonomous drones includes determining a number of tangents for the ad-hoc perimeter and the number of autonomous drones is based at least in part on the determined number of tangents.

11. The system of claim 10 wherein the computer readable instructions further comprise determining a total power for operating the autonomous drones used in creating the monitoring fence arrangement.

12. The system of claim 11 wherein a sum of a power rating for each of the autonomous drones is equal to or greater than the total power.

13. The system of claim 9 wherein the light source is a laser emitting light source.

14. The system of claim 13 wherein the light detector an optical receiver.

15. The system of claim 9 further comprising determining a stored energy level for each of the autonomous drones, and replacing a first autonomous drone of the autonomous drones with a second autonomous drone in response to the stored energy level of the first autonomous drone being below a predetermined threshold.

16. A computer program product for creating a monitoring fence about an ad-hoc perimeter, the computer program product comprising a non-transitory computer readable storage medium having program instructions embodied therewith, the program instructions executable by a processor to cause the processor to perform:
defining the ad-hoc perimeter to be monitored, the ad-hoc perimeter having at least one curved portion;
determining a tangent line to the at least one curved portion;
determining a number of autonomous drones for creating a monitoring fence arrangement of the ad-hoc perimeter, each of the autonomous drones including a movement detection mechanism, the movement detection mechanism including a light source and a light detector;
determining a position for each of the determined number of autonomous drones, at least one position being based at least in part on the tangent line;
transmitting the position to each of the autonomous drones;
projecting a light from the light source of at least one autonomous drone along the tangent line;
monitoring a status of the autonomous drones; and
transmitting a signal in response to at least one of the autonomous drones detecting a breach of the ad-hoc perimeter based at least in part on detecting movement by receiving with the light detector a reflection of the light by a surface along the tangent line.

17. The computer program product of claim 16 wherein the determining the number of autonomous drones includes determining a number of tangents for the ad-hoc perimeter and the number of autonomous drones is based at least in part on the determined number of tangents.

18. The computer program product of claim 16 wherein the computer readable instructions further comprise determining a total power for operating the autonomous drones used in creating the fence monitoring arrangement, and a sum of a power rating for operating each of the autonomous drones is equal to or greater than the total power for operating the autonomous drones used in the fence monitoring arrangement.

19. The computer program product of claim 16 wherein the computer readable instructions further comprise determining a stored energy level for each of the autonomous drones, and replacing a first autonomous drone of the autonomous drones with a second autonomous drone in response to the stored energy level of the first autonomous drone being below a predetermined threshold.

20. The method of claim 1 further comprising positioning at least one autonomous drone at the at least one position, wherein the at least one position is at the intersection of the tangent line and the at least one curved portion.

* * * * *